United States Patent
Dantes et al.

(10) Patent No.: US 6,983,900 B2
(45) Date of Patent: Jan. 10, 2006

(54) FUEL INJECTOR

(75) Inventors: Guenter Dantes, Eberdingen (DE); Detlef Nowak, Untergruppenbach (DE); Joerg Heyse, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 10/168,356

(22) PCT Filed: Oct. 19, 2001

(86) PCT No.: PCT/DE01/03989

§ 371 (c)(1),
(2), (4) Date: Oct. 3, 2002

(87) PCT Pub. No.: WO02/33247

PCT Pub. Date: Apr. 25, 2002

(65) Prior Publication Data

US 2003/0136380 A1 Jul. 24, 2003

(30) Foreign Application Priority Data

Oct. 20, 2000 (DE) .......................... 100 52 143

(51) Int. Cl.
B05B 1/30 (2006.01)
F02M 59/00 (2006.01)
F02M 47/02 (2006.01)

(52) U.S. Cl. ................. 239/585.1; 239/585.5; 239/533.2; 239/533.3; 239/585.3; 239/88

(58) Field of Classification Search ... 239/585.1–585.5, 239/533.2, 533.3, 533.7, 533.8, 533.9, 463, 239/468, 483, 487, 88–93; 251/129.15, 129.21
See application file for complete search history.

(56) References Cited

U.S. PATENT DOCUMENTS

| 4,423,843 | A |   | 1/1984  | Palma |
|-----------|---|---|---------|-------|
| 4,618,095 | A | * | 10/1986 | Spoolstra ................... 239/90 |
| 4,685,432 | A |   | 8/1987  | Saito et al. |
| 5,108,037 | A |   | 4/1992  | Okamoto et al. |
| 5,207,384 | A | * | 5/1993  | Horsting ................... 239/463 |
| 5,853,124 | A | * | 12/1998 | Beck et al. ................... 239/5 |
| 5,996,912 | A | * | 12/1999 | Ren et al. ................ 239/585.5 |

FOREIGN PATENT DOCUMENTS

DE         198 15 795 A1    10/1999

OTHER PUBLICATIONS

Patent Abstracts of Japan, vol. 1998, No. 09, Jul. 31, 1998 & JP 10 103194 A (Mitsubishi Electric Corp.), Apr. 21, 1998.

* cited by examiner

Primary Examiner—Davis Hwu
(74) Attorney, Agent, or Firm—Kenyon & Kenyon

(57) ABSTRACT

A fuel injector for fuel injection systems of internal combustion engines includes a valve needle and a valve closing body, which is operationally linked to it and cooperates with a valve seat face situated in a valve seat body to form a sealing seat. Upstream from the sealing seat there is at least one swirl channel, which has a tangential component relative to the longitudinal axis of the fuel injector. An axial channel, which is formed between the valve closing body and the guide recess of the valve seat body, has an axial component relative to the longitudinal axis of the fuel injector, the axial channel being formed between the guide recess and at least one flattened area on the valve needle.

5 Claims, 3 Drawing Sheets

FUEL INJECTOR

FIELD OF THE INVENTION

The present invention relates to a fuel injector.

BACKGROUND INFORMATION

U.S. Pat. No. 5,108,037 describes swirl-producing fuel injectors in which two flow paths are formed for the fuel. The fuel flow is split into two components in the area of the valve closing body. One component of the fuel flows through swirl channels arranged in a swirl disk. The fuel flow is imparted at a circumferential velocity which results in fuel being spray-discharged onto a conical envelope. The swirl disk has a central bore which is used to guide the valve closing body. The gap formed between the guide bore and the valve closing body is utilized in a targeted manner to permit a fuel leakage flow which flows without swirl in the axial direction through the guide bore. Upstream from the sealing seat, the axial fuel flow encounters the fuel flow in which a swirl has been induced. The fuel flows combine and are spray-discharged jointly. Therefore, fuel may be spray-discharged not only on a conical envelope but also as a solid cone.

German Patent Application No. 198 15 795 Al also describes a fuel injector in which two flow paths are formed to create a biflux flow. These flow paths are created in a common component which is inserted downstream from the sealing seat. This component is manufactured in a multilayer process and is inserted into a recess on the downstream end of the fuel injector. The fuel jet is spray-discharged directly out of the component that produces the swirl. The fuel flow is divided in this component into an axial flow component and a swirling flow component. The axial component of the flow is sent eccentrically to the swirling fuel flow again, so that the cone on which the fuel is spray-discharged becomes inclined toward the central axis of the fuel injector.

In the case of the fuel injector described in U.S. Pat. No. 5,108,037, the increased tolerance between the valve closing body and the guide bore is a disadvantage. This is necessary to achieve an adequate leakage flow to produce an axial flow. Due to the use of a spherical valve closing body and the associated linear throttling point, unavoidable fluctuations in fit are associated with a great scattering in the axial flow component. This increases the reject rate in manufacturing the fuel injector.

Another disadvantage is the inferior guidance of the valve closing body due to the greater radial clearance between the valve closing body and the guide bore. The valve closing body has fuel flowing around it during the spray-discharging process. Due to the spherical geometry and the increased clearance between the valve closing body and the guide bore, the tendency to vibrate is increased. Flutter of the valve closing body in turn results in greater wear on the fuel injector.

In the case of the fuel injector described in German Patent Application No. 198 15 795 Al, however, the arrangement downstream from the sealing seat is a disadvantage. This may easily produce carbonization of the swirl-producing component. It is therefore impossible to ensure reliable and constant processing of the fuel to be spray-discharged. Consequently, the atomization is inferior and ultimately there is an increased pollution burden due to the inferior combustion.

The fuel flow is split and then recombined downstream from the sealing seat. Therefore, there cannot be any change in the axial component of fuel flow during opening and closing of the valve.

The swirl element, which is constructed in multiple layers, also requires a complex manufacturing process and must be inserted into the fuel injector in the correct orientation due to the asymmetrical arrangement of the axial flow channel. This increases the manufacturing costs of the fuel injector.

SUMMARY

The example fuel injector according to the present invention has the advantage that the guidance still has a narrow tolerance. Only partial areas on the circumference of the guided component are used for flow guidance. Due to the good guidance of the valve needle, i.e., the valve closing body, wear on the fuel injector is minimized.

Due to the size of the flattened areas, the axial flow component is easily adjusted. In particular, large axial flow components are feasible because this does not result in any negative effect on the guidance of the valve needle, i.e., the valve closing body.

The simple design of variants of the fuel injector is advantageous. An individual adaptation to the specific requirements of a given internal combustion engine may be implemented while retaining most of the components.

BRIEF DESCRIPTION OF THE DRAWINGS

Exemplary embodiments are illustrated in simplified form in the drawing and explained in greater detail below.

DETAILED DESCRIPTION

Figure 1:
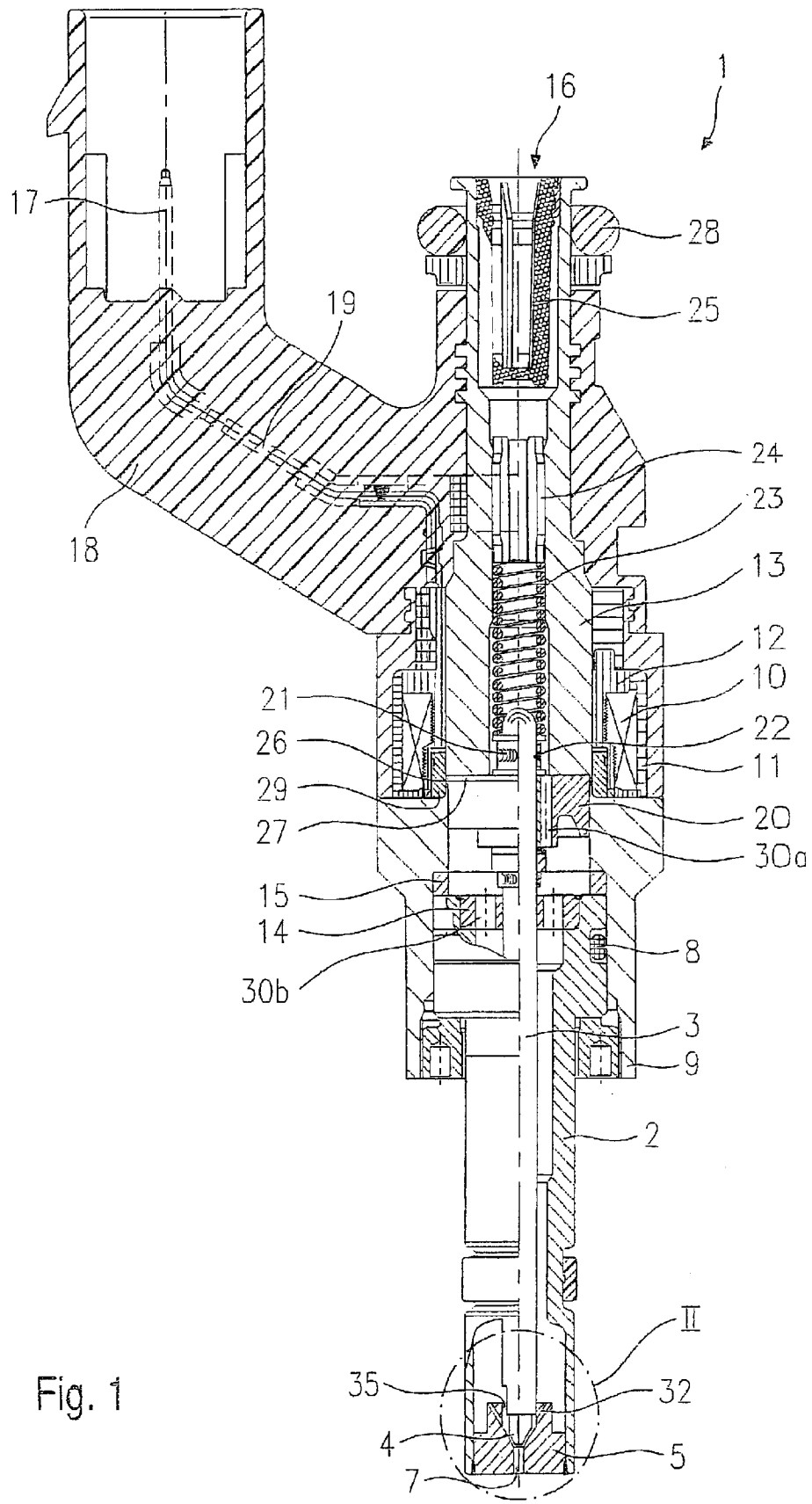
FIG. 1 shows a schematic partial sectional view through a first example embodiment of a fuel injector according to the present invention.

Before describing two exemplary embodiments of fuel injectors 1 according to the present invention in greater detail on the basis of FIGS. 2 through 4, fuel injector 1 according to the present invention will first be described briefly with regard to its components on the basis of an overall diagram in FIG. 1.

Fuel injector 1 is implemented in the form of a fuel injector 1 for fuel injection systems of internal combustion engines having compression of a gas mixture with spark ignition. Fuel injector 1 is suitable in particular for direct injection of fuel into a combustion chamber (not shown) of an internal combustion engine.

Fuel injector 1 includes a nozzle body 2 in which a valve needle 3 is arranged. Valve needle 3 is operationally linked to a valve closing body 4 which cooperates with a valve seat face 6 situated on a valve seat body 5 to form a sealing seat. In this embodiment, fuel injector 1 is an electromagnetically operated fuel injector 1 having a spray-discharge opening 7. Nozzle body 2 is sealed by a gasket 8 with respect to the stationary pole of a solenoid 10. Solenoid 10 is encapsulated in a coil casing 11 and wound onto a field spool 12 which contacts a revolving pole 13 of solenoid 10. Revolving pole 13 and stationary pole 9 are separated by a gap 26 and supported on a connecting component 29. Solenoid 10 is energized by an electric current suppliable over a line 19 via an electric plug contact 17. Plug contact 17 is encased in a plastic sheathing 18 which may be extruded onto revolving pole 13.

Valve needle 3 is guided in a valve needle guide 14 designed in the form of a disk. It is paired with an adjusting disk 15 which is used to adjust the valve needle lift. An armature 20 is situated on the upstream side of adjusting disk 15. It is connected with an interference fit via a flange 21 to valve needle 3 which is connected to flange 21 by a weld 22. A restoring spring 23 is supported on flange 21; in this example design of fuel injector 1, the spring is prestressed by a sleeve 24 pressed into revolving pole 13.

Fuel channels 30a, 30b run in valve needle guide 14 and in armature 20. A filter element 25 is situated in a central fuel feed 16. Fuel injector 1 is sealed by a gasket 28 against a fuel line (not shown).

In the idle state of fuel injector 1, armature 20 is acted upon against its direction of lift by restoring spring 23 by way of flange 21 on valve needle 3 so that valve closing body 4 is held in sealing contact on valve seat face 6. On energization of solenoid 10, it builds up a magnetic field which moves armature 20 against the spring force of restoring spring 23 in the direction of lift, the lift being determined by a working clearance 27 provided between revolving pole 13 and armature 20 in the rest position. Armature 20 also entrains flange 21, which is welded to valve needle 3, and thus also entrains valve needle 3 in the direction of lift. Valve closing body 4, which is operationally linked to valve needle 3, is lifted up from valve seat face 6, and fuel reaching spray-discharge opening 7 through swirl channels 32 and one axial channel 35 is spray-discharged.

When the coil current is turned off, after the magnetic field has dissipated adequately, armature 20 drops back from revolving pole 13 onto flange 21 due to the pressure of restoring spring 23, so that valve needle 3 is moved against the direction of lift. Therefore, valve closing body 4 sits on valve seat face 6 and fuel injector 1 is closed.

Figure 2:
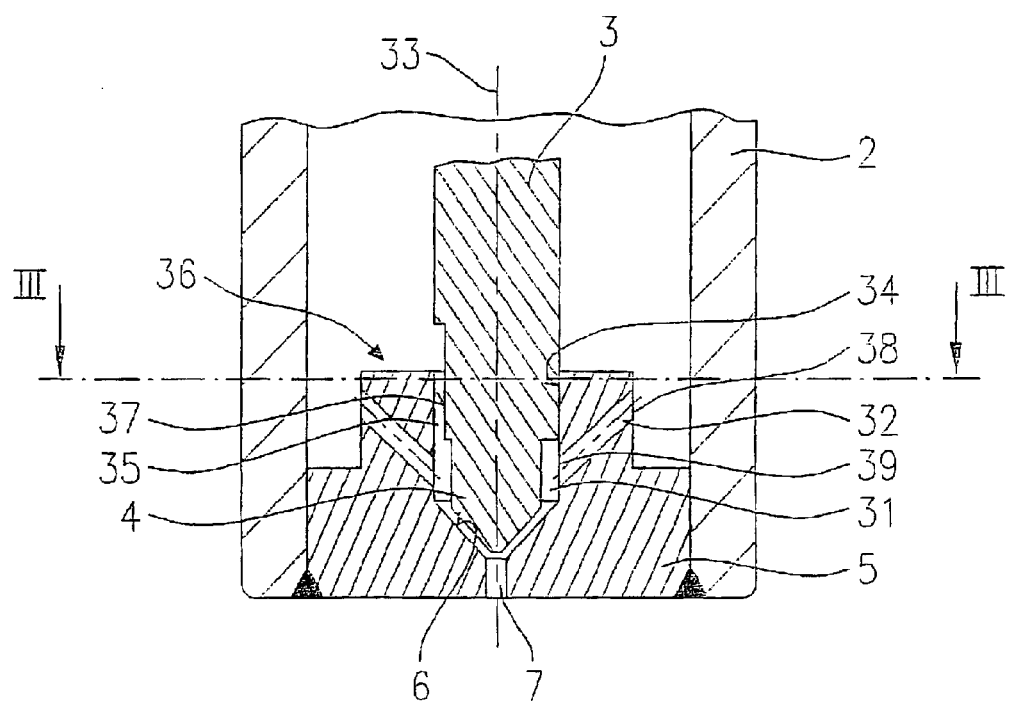
FIG. 2 shows a schematic sectional view in detail II of FIG. 1 through the first example embodiment of a fuel injector according to the present invention.

FIG. 2 illustrates a first exemplary embodiment having a one-piece design for swirl production and the valve seat. A centrally arranged guide recess 34 is introduced into valve seat body 5, a valve seat face 6 being arranged on its downstream end. Downstream from valve seat face 6 there follows spray-discharge opening 7. Valve seat body 5 has on its upstream end a cylindrical extension 36 whose radial extent is smaller than the inside radial extent of tubular nozzle body 2. Swirl channels 32 whose inlet opening 38 is situated in the fuel-filled interspace between cylindrical extension 36 of valve seat body 5 and nozzle body 2 are introduced into cylindrical extension 36 of valve seat body 5. Swirl channels 32 have a tangential component relative to longitudinal axis 33 of fuel injector 1 which imparts a circumferential velocity on the fuel flowing through swirl channels 32, and these channels open into guide recess 34 upstream from valve seat face 6. In addition to the tangential component, swirl channels 32 may also have an axial component.

The manufacture of valve seat body 5 and the introduction of swirl channels 32 are accomplished, e.g., by laser drilling, conventional drilling, erosion, sintering, or embossing. The tolerance of swirl channels 32 may be relatively rough because it does not have any effect on the metering of the fuel that is spray-discharged. With regard to the number of components to be installed, the one-piece design for producing swirl offers advantages, but it may also be designed as a multi-part assembly. For example, it is possible for a valve seat body 5 to have spray-discharge opening 7 and valve seat face 6 with a swirl disk situated upstream from it, swirl channels 32 and guide recess 34 being introduced into the disk.

Valve needle 3 and valve closing body 4 are designed in one piece in the embodiment illustrated here. The radial extent of valve closing body 4 in the area of mouth 39 of swirl channels 32 is smaller than the radial extent of guide recess 34, so that an annular gap 31 is formed between valve closing body 4 and guide recess 34 of valve seat body 5. The cross section of annular gap 31 determines the metering of fuel to be spray-discharged. Upstream from annular gap 31, valve needle 3 has one or more flattened areas 37 which cooperate with guide recess 34 to form one or more axial channels 35 and which may be manufactured, e.g., in the form of polished sections. Axial channels 35 run parallel to longitudinal axis 33 of fuel injector 1. Valve needle 3 is guided in guide recess 34 through the unflattened areas of valve needle 3 illustrated in FIG. 3.

The sum of the cross sections of swirl channels 32 and axial channels 35 formed by flattened areas 37 is greater than the cross section of annular gap 31 between valve closing body 4 and guide recess 34, so that the development of the swirl in the fuel flow is separated from the metering of the quantity of fuel spray-discharged. This means that a rougher tolerance is allowed in the cross section of swirl channels 32, thus resulting in lower production costs.

Figure 3:
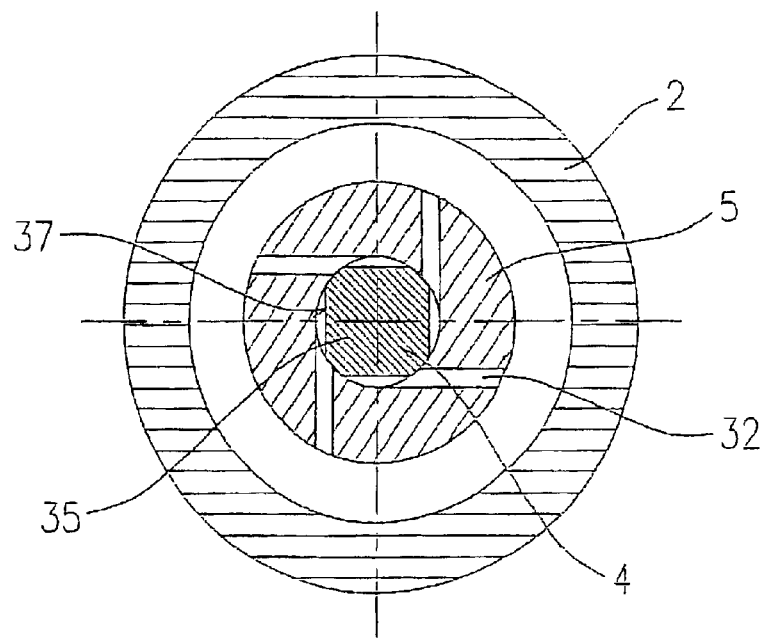
FIG. 3 shows a section along line III—III in FIG. 2 of the first example embodiment.

FIG. 3 illustrates the orientation of swirl channels 32 relative to flattened areas 37 of valve needle 3. Swirl channels 32 and valve needle 3 are oriented relative to one another so that when fuel injector 1 is open the two flow components encounter one another directly. The mouth of the four swirl channels 32 in the illustrated example is situated in the downstream extension of the four axial channels 35.

Figure 4:
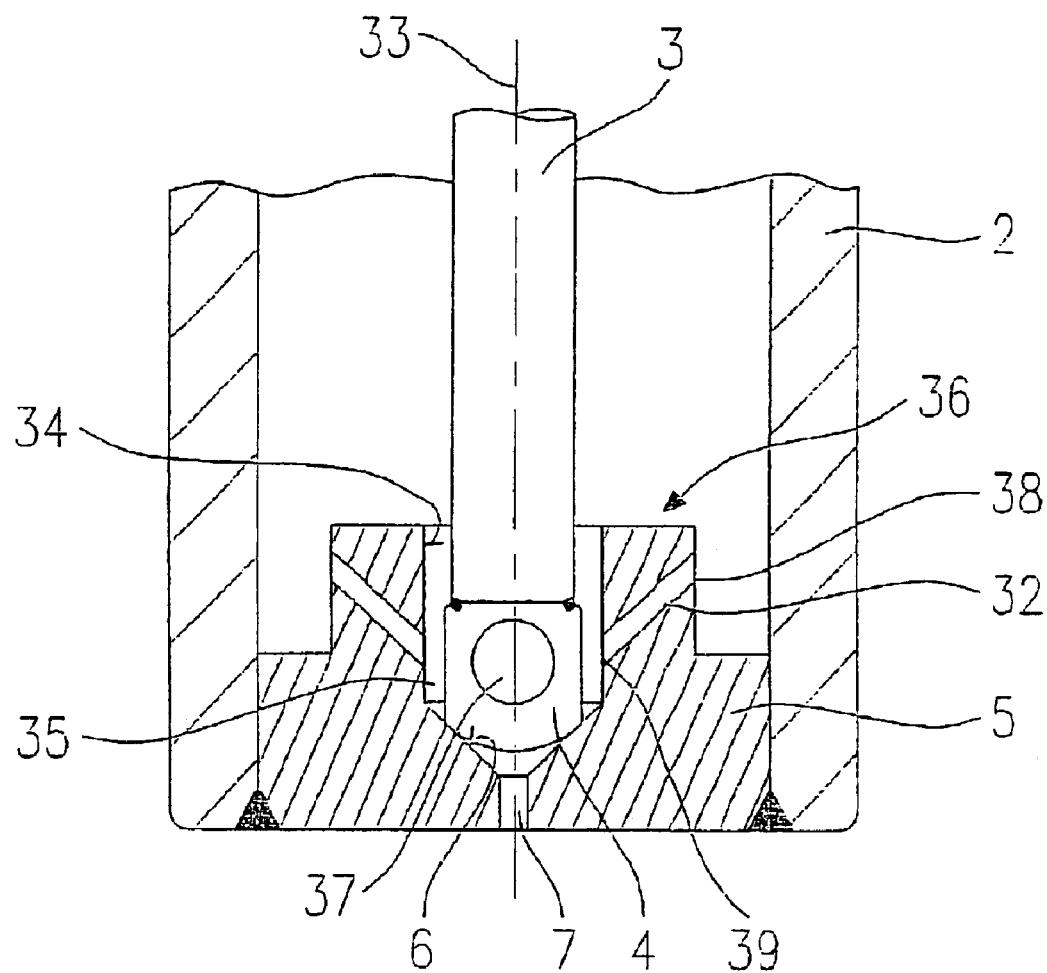
FIG. 4 shows a schematic partial sectional view in detail II of FIG. 1 through a second example embodiment of a fuel injector according to the present invention.

Another embodiment is illustrated in FIG. 4. Valve needle 3 and valve closing body 4 are two components which are joined by welding, for example. Valve needle 3 has a smaller radial extent than valve closing body 4, which is preferably spherical. One or more flattened areas 37 are arranged on valve closing body 4 and cooperate with guide recess 34 to form axial channels 35. The unflattened areas are used to guide valve closing body 4.

Valve seat body 5 corresponds to the first exemplary embodiment from FIG. 2 as explained above. Swirl channels 32 open into axial channels 35. As an alternative, swirl channels 32 may also open directly upstream from valve seat face 6, so that their mouth is situated downstream from axial channels 35 when fuel injector 1 is open. In this way it is possible to stipulate the number and orientation of swirl channels 32 and axial channels 35 independently of one another.

What is claimed is:

1. A fuel injector for a fuel injection system of an internal combustion engine comprising:

a valve needle;

a valve closing body operationally linked to the valve needle;

a valve seat body having a valve seat face situated therein, the valve closing body cooperating with the valve seat face to form a sealing seat;

at least one swirl channel upstream from the sealing seat, the at least one swirl channel having a tangential component relative to a longitudinal axis of the fuel injector; and an axial channel situated between the valve closing body and the guide recess of the valve seat body, the axial channel having an axial component relative to the longitudinal axis of the fuel injector, the axial channel being situated between the guide recess and at least one flattened area on one of: i) the valve needle, and ii) on the valve closing body;

wherein the at least one swirl channel opens into the axial channel.

2. The fuel injector according to claim 1, wherein an annular gap is situated between the valve closing body and the guide recess downstream from the axial channel.

3. A fuel injector for a fuel injection system of an internal combustion engine comprising:

a valve needle;

a valve closing body operationally linked to the valve needle;

a valve seat body having a valve seat face situated therein, the valve closing body cooperating with the valve seat face to form a sealing seat;

at least one swirl channel upstream from the sealing seat, the at least one swirl channel having a tangential component relative to a longitudinal axis of the fuel injector; and an axial channel situated between the valve closing body and the guide recess of the valve seat body, the axial channel having an axial component relative to the longitudinal axis of the fuel injector, the axial channel being situated between the guide recess and at least one flattened area on one of: i) the valve needle, and ii) on the valve closing body;

wherein the at least one swirl channel has an axial component in addition to the tangential component.

4. The fuel injector according to claim 3, wherein an annular gap is situated between the valve closing body and the guide recess downstream from the axial channel.

5. The fuel injector according to claim 4, wherein the at least one swirl channel opens into the annular gap.

\* \* \* \* \*